Patented Oct. 15, 1935

2,017,537

UNITED STATES PATENT OFFICE 2,017,537

PRODUCTION OF HYDROXY-ALKYLAMINO CARBOXYLIC ACID COMPOUNDS

Ulrich Hoffmann and Bernhard Jacobi, Ludwigshafen-on-the-Rhine, Germany, assignors to I. G. Farbenindustrie Aktiengesellschaft, Frankfort-on-the-Main, Germany No Drawing. Application August 11, 1932, Serial No. 628,361. In Germany August 26, 1931

8 Claims. (Cl. 260—106)

In the British Patents Nos. 306,116, 337,774 and 337,737 there have been described processes for the production of esters, amides, or ester amides by heating hydroxy-alkyl amines with carboxylic acids, or derivatives thereof to comparatively high temperatures.

We have now found that the interaction of hydroxy-alkyl amines with unsaturated carboxylic acids, or derivatives thereof, may take another course and that hydroxy-alkyl-amino acid substances can be obtained by reacting primary or secondary alkylol amines, that is amines containing at least one aliphatic radicle with one or more hydroxyl groups and at least one hydrogen atom connected to nitrogen, with unsaturated carboxylic acid substances having an aliphatic carboxylic acid chain in which an unsaturated linkage between carbon atoms, i. e. an olefinic linkage, is situated in the $\alpha$, $\beta$-position to the carboxylic group. The said acid substances may contain one or more carboxylic acid groups and by the terms "acid substances" and "carboxylic groups" it is intended to include the free carboxylic acids as well as their salts and compounds, or groups respectively, which are saponifiable to carboxylic acids or salts thereof, as for example esters, nitriles, amides, imides, halides and anhydrides. When working with such acid substances as are comparatively sensitive to alkalies, such as free carboxylic acids or halides or anhydrides thereof, the acid substances are usually first converted into the corresponding salts or amides with the alkylol amines, the formation of salt preceding the formation of amide. These primary reaction products then add on the alkylol amines and may be finally reconverted into free hydroxyalkylamino acids by the splitting of the salts or amides. Similarly, esters may be saponified in the first instance to form the hydroxy-alkyl amine salts which then add on the alkylol amines. For the sake of brevity the said unsaturated organic acid substances will be defined in the following and in the claims annexed hereto as $\alpha$, $\beta$-olefinic carboxylic acid substances. Several specific instances of substances of the said type are for example acrylic acid, crotonic acid, $\alpha$, $\beta$-hydrosorbic acid (CH$_3$—CH$_2$—CH$_2$—CH=CH—COOH), itaconic acid, cinnamic acid, maleic acid, fumaric acid, acrylic chloride, acrylic alkyl esters for example from methyl to octodecyl esters, acrylic amide, acrylic-N-alkyl amides or crotonic N-alkylol amides, fumaric diethyl ester, maleic anhydride, maleic imide, fumaric di-nitrile and acrylic or crotonic nitriles.

As specific examples of alkylol amines may be mentioned mono- and di-ethanol amines, N-methyl-N-ethanol amine and decylol, hexadecylol and octodecylol amines containing at least one hydrogen atom connected to nitrogen, amino-1-propandiol-2.3 N-aryl-N-hydroxyalkyl amines, such as N-ethanol aniline, or N-cycloalkyl-N-hydroxy alkylol amines, such as N-cyclohexyl-N-butanol amine.

The reaction is generally carried out with equivalent proportions of alkylol amine and of acid present or formed. This means that one molecular proportion of a free mono-carboxylic acid of the said type is generally reacted with about one molecular proportion of alkylol amine, whereas in the case of a possible saponification of a carboxylic acid derivative care should be taken that any acid formed, as may occur on working with acid halides, is neutralized by a sufficient quantity of alkylol amine. Thus for example on working with a monocarboxylic acid halide about 2 molecular proportions of alkylol amine will be employed. The same provision is taken if acid anhydrides be used.

During the reaction $\beta$-hydroxy-alkylamino compounds (containing the general grouping

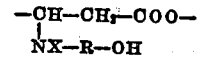

in which X denotes hydrogen or an aliphatic, cycloaliphatic or aromatic radicle and R denotes an alkylene radicle) are formed in a preponderating amount as a rule, small amounts of the corresponding $\alpha$-hydroxy-alkylamino compounds also being obtained. Amino-alkoxy compounds, in which the alkyl radicle is connected to a carbon atom of the carboxylic acid substance (≡C—O—R—N=), are only formed to quite a subordinate extent, if at all, in contradistinction to the experience and knowledge from the condensation of alcohols in the presence of alkali with certain $\alpha$, $\beta$-unsaturated carboxylic acids or esters and nitriles, though the alkylol amines employed in the process according to the present invention also contain alcoholic hydroxyl groups.

The reaction usually proceeds exothermically and is therefore advantageously carried out while cooling. Cooling is necessary if a conversion of the initial carboxylic acid substance is to be avoided. Thus for example cooling is required if a carboxylic acid ester be employed and the corresponding hydroxy-alkylamino carboxylic ester be desired since otherwise the hydroxy-alkylamino carboxylic acid, or its salt with the hydroxy-alkyl amine employed, respectively, would be obtained. If desired, the reaction may be carried out in the presence of inert solvents, as for example methyl, ethyl, propyl or butyl alcohols, benzene or its homologues, tetra- or decahydro-naphthalenes, benzene or similar petroleum fractions, halogenated hydrocarbons such as chloroform, esters of saturated fatty acids, provided these latter are employed while cooling, and formamide. In many cases quantities of the reaction components in excess to those required for the reaction itself may also serve as diluent or solvent. The reaction is usually carried out at temperatures between room temperature and about 200° C., the temperature varying depending on the nature of the initial materials; when employing the lowest members of the aforesaid carboxylic acid substances the temperatures of working will be chosen in the lower portion of the aforesaid temperature range, whereas on working with higher members of the said carboxylic acid substances, the temperatures will generally be chosen from the higher range of the aforesaid temperatures. If desired condensation catalysts such as strong acids or acid reacting salts, as for example salts of amines with strong acids or agents preventing polymerization of the initial acid substances, such as copper powder or copper salts may be added in quantities of from about 1 to about 30 per cent of the whole initial materials.

The hydroxy-alkyl-amino compounds prepared according to the present invention are generally solid or liquid substances of comparatively high boiling points and usually very stable to chemical influences. On working in the manner described they are usually obtained directly in a pure state. By reason of their dual activity as amino and hydroxyl compounds they may form salts or amides with organic or inorganic acids or they may be esterified for example with acetic, oleic or stearic acids or anhydrides or halides, such as benzoyl chloride, or etherified for example with the aid of alkyl halides, alkylene oxides or alkylene halogen hydrins. If a hydrogen atom be still connected to nitrogen after the reaction, it may be substituted by alkyl or hydroxy-alkyl radicles for example with the aid of alkyl halides, alkylene oxides or alkylene halogen hydrins. The products according to the present invention may be therefore advantageously employed as intermediate products for the production of pharmaceutical agents or of assistants for the textile industries. Moreover, by reason of their capacity for dissolving substances employed in the lacquer industries as for example nitrocellulose the hydroxy-alkylamino carboxylic esters and nitriles and other compounds obtainable in accordance with the present invention are suitable for use as solvents and softening agents.

The following examples will further illustrate the nature of this invention but the invention is not restricted to these examples. The parts are by weight.

Example 1

75 parts of mono-propanolamine are introduced while stirring into 100 parts of acrylic ethyl ester. The mutually insoluble substances gradually react with a strong evolution of heat. Care is taken by cooling that the temperature does not rise above 60° C. In this manner a practically quantitative yield of hydroxypropyl-beta-aminopropionic acid ethyl ester

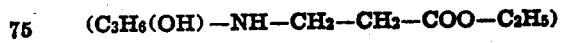

is obtained. The product is soluble in water and alcohols but insoluble in ethyl ether. The said ester is capable of forming salts with acids and may be saponified to salts of the corresponding amino carboxylic acid with the aid of bases. By the introduction of a further alkyl group into the amino group or by reaction with fatty acids, such as acetic, oleic or stearic acids, acid anhydrides or halides, such as benzoyl chloride, or with inorganic acids, new compounds are obtained.

Example 2

86 parts of fumaric diethyl ester are caused to react with 30.5 parts of mono-ethanol amine in the manner described in Example 1. N-hydroxyethyl aminosuccinic acid diethyl ester is obtained in very good yields.

Example 3

63 parts of crotonic allyl ester are mixed while cooling with 30.5 parts of monoethanol amine. In this way the allyl ester of N-(hydroxyethyl)-β-amino-butyric acid

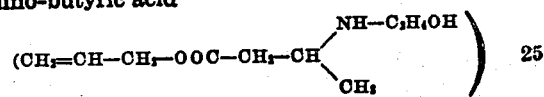

is obtained in very good yields.

Example 4

53 parts of acrylic nitrile are caused to react with 105 parts of diethanol amine while stirring continuously and cooling well. As soon as the reaction has subsided, the reaction product is heated up to 60° C. N.N-di-(hydroxyethyl)-β-amino propionitrile

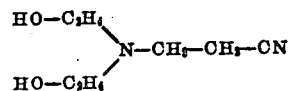

is obtained in almost quantitative yields. The nitrile may be converted into the corresponding carboxylic acid by saponification with caustic potash or soda or into the corresponding diamine by hydrogenation, for example with the aid of hydrogen and a hydrogenation catalyst such as nickel. The hydroxyl groups present are reactive; they may be esterified with carboxylic or inorganic acids, for example, or etherified with the aid of alkylene oxides.

Example 5

53 parts of acrylic nitrile are caused to react with 61 parts of monoethanolamine while cooling. N-hydroxyethyl-beta-aminopropionitrile

is obtained in an almost quantitative yield.

Example 6

86 parts of crotonic acid are introduced while stirring into 200 parts of mono-ethanol amine, the mixture then being heated to 160° C. for 5 hours under a reflux condenser. In this way a salt of the crotonic acid with the amine is first formed and then the ethanol amine adds on to the double linkage with the simultaneous formation of the corresponding carboxylic acid amide (hydroxyethylamide of N-(hydroxyethyl)-β-amino-butyric acid

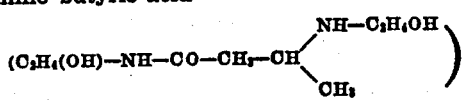

The unchanged monoethanol amine and the water formed are distilled off under reduced pressure and the residue is saponified with aqueous caustic soda solution and finally evaporated. By recrystallization from ethyl alcohol, the sodium salt of N-(hydroxyethyl-β-amino-butyric acid (melting point 130° C.) is obtained in a yield of 82 per cent of the theoretical yield. The same product is obtained when the crotonic acid is replaced by crotonic chloride and the resulting N-(hydroxyethyl)-β-amino-butyric acid ethanol amide is saponified with the aid of caustic soda.

*Example 7*

100 parts of acrylic ethyl ester are heated for 4 hours at 100° C. with 134 parts of N-cyclohexyl monoethanol amine and an addition of 1 part of copper powder for preventing polymerization of the acrylic ester. The reaction product is then subjected to distillation under reduced pressure. The unchanged acrylic acid ethyl ester first distils over and then at from 138° to 140° C. (at 22 millimeters mercury gauge) the N-cyclo-hexyl-N-hydroxyethyl-aminopropionic acid ethyl ester

distils over. The yield amounts to 70 per cent of the theoretical yield besides unchanged initial materials.

What we claim is:—

1. The process for the production of hydroxy-alkyl-amino carboxylic acid compounds which comprises reacting an alkylolamine, containing at least one hydrogen atom connected to nitrogen, with an α, β-olefinic carboxylic acid substance.

2. The process for the production of hydroxy-alkyl-amino carboxylic acid compounds which comprises reacting an alkylolamine, containing at least one hydrogen atom connected to nitrogen with an α, β-olefinic polycarboxylic acid substance.

3. The process for the production of hydroxy-alkylamino carboxylic acid compounds which comprises reacting a secondary alkylol amine with an α, β-olefinic carboxylic acid substance.

4. The process for the production of hydroxy-alkyl-amino carboxylic acid compounds which comprises reacting an α, β-olefinic carboxylic acid substance with a quantity of an alkylolamine, containing at least one hydrogen atom connected to nitrogen, about equivalent to acid radicles present in said carboxylic acid substance.

5. The process for the production of hydroxy-alkyl-amino carboxylic acid compounds which comprises reacting a saponifiable α, β-olefinic carboxylic acid substance, while cooling, with a quantity of an alkylolamine, containing at least one hydrogen atom connected to nitrogen, about equivalent to acid radicles present in said carboxylic acid substance.

6. Hydroxy-alkylamino carboxylic acid compounds containing the grouping

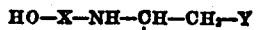

in which X denotes an alkylene radicle, denotes hydrogen or an aliphatic or cyloaliphatic radicle and Y denotes —COOH, —COOM (M being an alkali or alkaline earth metal), —CO—OR₃ (R₃ being the radicle of an alcohol), —C≡N, or —CO—NHZ (Z being hydrogen, an aliphatic, cycloaliphatic or acyl radicle).

7. N-(hydroxypropyl)-beta-aminopropionic acid ethyl ester.

8. N-(hydroxy-ethyl)-β-amino-butyric acid.

ULRICH HOFFMANN.
BERNHARD JACOBI.